(12) United States Patent
Mizawa et al.

(10) Patent No.: US 8,261,987 B2
(45) Date of Patent: Sep. 11, 2012

(54) CARD PROCESSING DEVICE AND A CARD PROCESSING SYSTEM

(75) Inventors: Mamoru Mizawa, Nagano (JP); Shinya Miyazawa, Nagano (JP); Kazutoshi Ishikawa, Nagano (JP); Ikuro Kuribayashi, Nagano (JP); Keiji Hoson, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 13/074,167

(22) Filed: Mar. 29, 2011

(65) Prior Publication Data

US 2011/0240738 A1  Oct. 6, 2011

(30) Foreign Application Priority Data

Mar. 30, 2010  (JP) .................................. 2010-076670

(51) Int. Cl.
  *G06K 7/08* (2006.01)
  *G06Q 40/00* (2012.01)
(52) U.S. Cl. ........ 235/449; 235/379; 235/381; 235/439; 235/486
(58) Field of Classification Search .................. 235/439, 235/449, 483, 486, 379, 487, 493
See application file for complete search history.

(56) References Cited

U.S. PATENT DOCUMENTS

| | | | | |
|---|---|---|---|---|
| 3,909,595 A | * | 9/1975 | Morello et al. | 235/435 |
| 4,278,879 A | * | 7/1981 | Hofmann et al. | 235/380 |
| 5,942,744 A | * | 8/1999 | Kamo et al. | 235/487 |
| 6,016,959 A | * | 1/2000 | Kamo et al. | 235/449 |
| 6,149,064 A | * | 11/2000 | Yamaoka et al. | 235/479 |
| 6,527,187 B1 | * | 3/2003 | Nagata et al. | 235/475 |
| 6,783,399 B2 | * | 8/2004 | Joung | 439/630 |
| 6,923,372 B2 | * | 8/2005 | Hirasawa et al. | 235/449 |
| 2004/0007620 A1 | * | 1/2004 | Hirasawa et al. | 235/449 |

FOREIGN PATENT DOCUMENTS

| | | | |
|---|---|---|---|
| JP | 05006604 A | * | 1/1993 |
| JP | 2003-323588 | | 11/2003 |
| JP | 2007-011458 | | 1/2007 |

* cited by examiner

*Primary Examiner* — Tuyen K Vo
(74) *Attorney, Agent, or Firm* — Frommer Lawrence & Haug LLP

(57) ABSTRACT

To provide a card processing device that can accurately determine whether or not a normal card is inserted at a card insertion slot. A card processing device is equipped with a width-detecting mechanism that detects the width of a card inserted at a card insertion slot and outputs a width detection signal, a thickness-detecting mechanism that detects the thickness of the card inserted at the card insertion slot and outputs a thickness detection signal, an AND circuit to which the width-detecting mechanism and the thickness-detecting mechanism are connected and which outputs a card detection signal when the width detection signal and the thickness detection signal are input, and a computation circuit that outputs control signals to implement predetermined controls based on the card detection signal input from the AND circuit.

5 Claims, 4 Drawing Sheets

CARD PROCESSING DEVICE AND A CARD PROCESSING SYSTEM

The present application claims priority from Japanese Patent Application Nos. JP 2010-076670 filed on Mar. 30, 2010, the disclosure of which is incorporated herein by reference in its entirety.

1. FIELD OF THE INVENTION

The present invention relates to a card processing device that performs predetermined processing with respect to cards and to a card processing system equipped with this card processing device.

2. DESCRIPTION OF RELATED ART

There are card readers provided with a shutter that closes a card transport passage in order to prevent deformed cards, abnormal cards or foreign matter from entering the inside the card reader. This shutter keeps the card transport passage closed until a card is inserted at a card insertion slot and opens the card transport passage when it detects that a normal card has been inserted at the card insertion slot.

A conventional card insertion detector detects whether or not a normal card is inserted at the card insertion slot by detecting the width of the card (in other words, by detecting the card in the card width direction) (see Unexamined Japanese Patent Application Tokkai 2003-323588 ("JP 2003-323588"), for example)

Another known card insertion detector detects whether or not a normal card is inserted at the card insertion slot by detecting the thickness of the card (in other words, by detecting the card in the card thickness direction) (see Unexamined Japanese Patent Application Tokkai 2007-11458 ("JP 2007-11458"), for example).

In recent years, malicious mischief and crime involving card readers have been increasing; one may deceive a card insertion detecting mechanism to mistakenly detect the insertion of a normal card even though a normal card has not been inserted at a card insertion slot, causing the card reader to open its shutter allowing malicious mischief or crime to be committed. However, conventionally the width or the thickness of the card is detected to determine whether or not a normal card is inserted at the card insertion slot; therefore, the card reader may not accurately determine whether or not a normal card is inserted and may mistakenly open the shutter.

SUMMARY OF THE INVENTION

Therefore, an objective of the present invention is to provide a card processing device capable of accurately determining whether or not a normal card is inserted at the card insertion slot. Also, another objective of the present invention is to provide a card processing system equipped with the card processing device.

To solve the above problems, the card processing device of the present invention is equipped with a width-detecting mechanism that detects the width of a card inserted at a card insertion slot and outputs a width detection signal, a thickness-detecting mechanism that detects the thickness of the card inserted at the card insertion slot and outputs a thickness detection signal, an AND circuit to which the width-detecting mechanism and the thickness-detecting mechanism are connected and which outputs a card detection signal when the width detection signal and the thickness detection signal are input, and a computation circuit that outputs control signals to implement predetermined controls based on the card detection signal input from the AND circuit.

The card processing device of the present invention is equipped with the width-detecting mechanism and the thickness-detecting mechanism. Therefore, whether or not the card inserted at the card insertion slot is a normal card can be determined by detecting the width and the thickness of a card. Thus, the present invention enables a correct judgment on whether or not a normal card is inserted at the card insertion slot.

Also, in a card processing device equipped with the width-detecting mechanism and the thickness-detecting mechanism, a width detection signal is output from the width-detecting mechanism and a thickness detection signal is output from the thickness-detecting mechanism; therefore, the processing load in the computation circuit, which outputs control signals to implement predetermined controls, may be heavy compared to a conventional device. On the other hand, the card processing device of the present invention is equipped with the AND circuit that outputs a card detection signal when both the width detection signal and the thickness detection signal are input; the computation circuit outputs control signals to implement predetermined controls based on the card detection signal which has been input from the AND circuit. Therefore, two separate signals, the width detection signal and the thickness detection signal, will not be input to the computation circuit. Also, the card detection signal will not be input to the computation circuit unless both the width detection signal and the thickness detection signal are input to the AND circuit. Thus, in the present invention, a processing load in the computation circuit can be reduced although the card processing device is equipped with both the width-detecting mechanism and the thickness-detecting mechanism. Further, in the present invention, the number of connection ports of the computation circuit can be reduced compared to the device in which two separate signals, the width detection signal and the thickness detection signal, are input to the computation circuit.

In the present invention, the card processing device is equipped with a shutter movable between a closed position to close a card transport passage on which cards are transported and an open position to open the card transport passage and a shutter driving circuit to drive the shutter; the width-detecting mechanism and the thickness-detecting mechanism are arranged between the card insertion slot and the shutter, and the computation circuit outputs to the shutter driving circuit a shutter-open signal with which to move the shutter to the open position based on the card detection signal. The present invention enables a correct judgment on whether or not a normal card is inserted at the card insertion slot; therefore, the opening and closing of the shutter are properly controlled to prevent malicious mischief and crime. For this reason, the reliability of the card processing device can be increased.

In the present invention, it is preferred that the card processing device be provided with a magnetic head between the card insertion slot and the shutter for detecting a magnetic stripe formed on a card and outputting a magnetic stripe detection signal to the computation circuit. In this way, whether or not a magnetic stripe is formed on the card can be detected, in addition to the detection of the width and thickness of the card, so that whether or not the card inserted at the card insertion slot is a normal card can be accurately determined. Consequently, the opening/closing of the shutter can be properly controlled to prevent malicious mischief and crime, thus increasing the reliability of the card processing device.

It is preferred in the present invention that the width-detecting mechanism be equipped with a width-direction contact member that is displaced as it makes contact with an end face of the card in the width direction and a width-detecting sensor that detects the displacement of the width-direction contact member, and the thickness-detecting mechanism be equipped with a thickness-direction contact member that is displaced as it makes contact with the front face of the card and a thickness-detecting sensor that detects the displacement of the thickness-direction contact member. In this way, the width-direction contact member and the thickness-direction contact member make contact with the card directly; therefore, the accuracy of detecting the card in the width direction and the thickness direction of the card can be increased. Thus, whether or not a normal card is inserted at the card insertion slot can be accurately determined.

The card processing device of the present invention can be applied to a card processing system having a control command unit which is connected to the computation circuit. In this card processing system, whether or not a normal card is inserted at the card insertion slot can be determined. This card processing system is also configured such that when a card to be processed has a magnetic stripe formed thereon, the control command unit outputs a control command to the computation circuit to output a shutter-open signal when the card detection signal and the magnetic stripe detection signal are input via the computation circuit. This card processing system is also configured such that when a card to be processed does not have a magnetic stripe formed thereon, the control command unit outputs a control command to the computation circuit to output the shutter-open signal when both the card detection signal is input via the computation circuit. In this way, the card processing system equipped with the card processing device determines according to the card to be processed whether or not the magnetic stripe detection signal should be used for a shutter open/close control.

As described above, in the card processing device and the card processing system of the present invention, it is possible to accurately determine whether or not a normal card is inserted at the card insertion slot.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
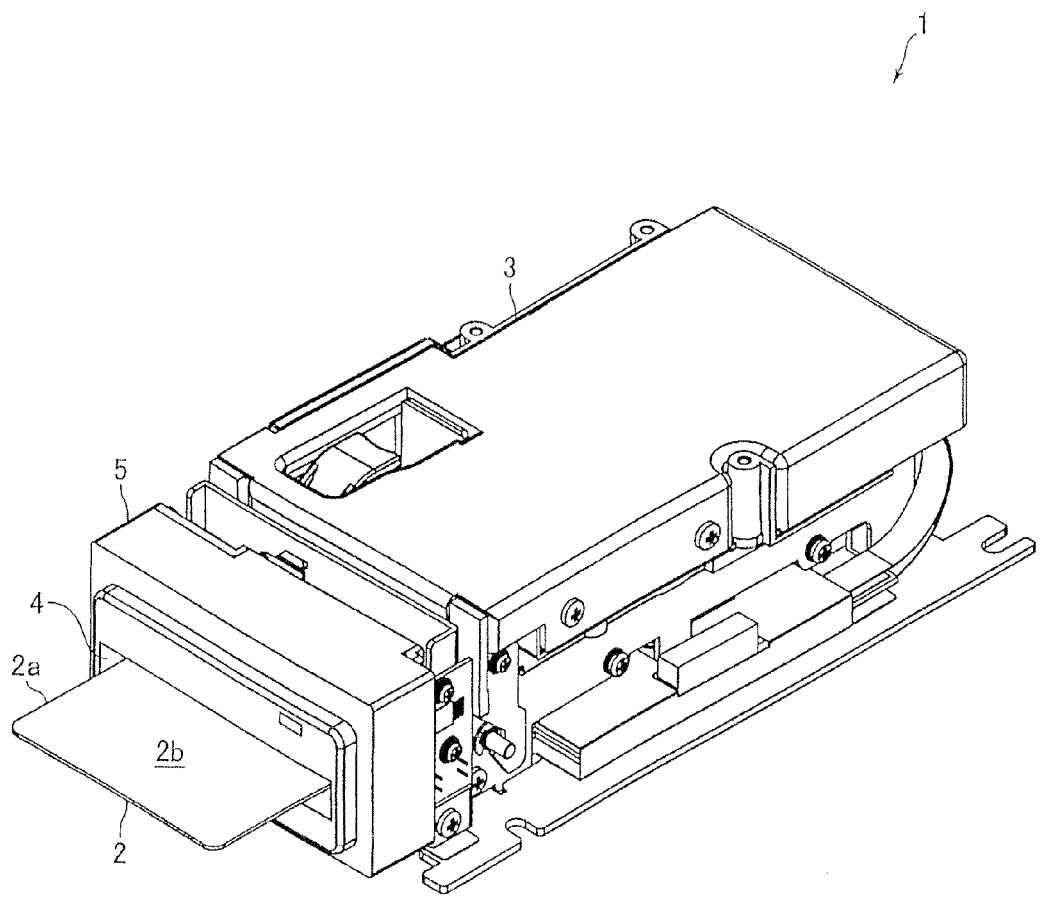
FIG. 1 shows a perspective view of a card processing device of an embodiment of the present invention.
Figure 2:
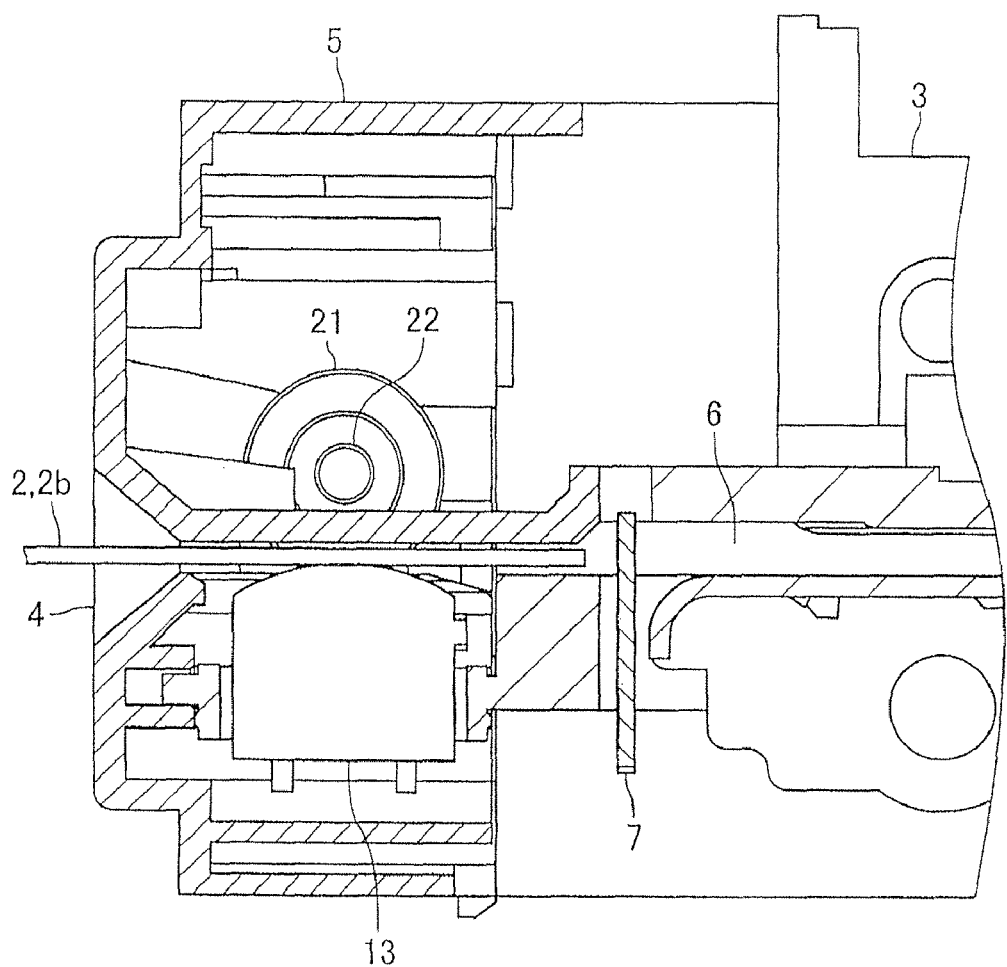
FIG. 2 shows a cross-sectional view of a card inserting section and part of a main section shown in FIG. 1.
Figure 3:
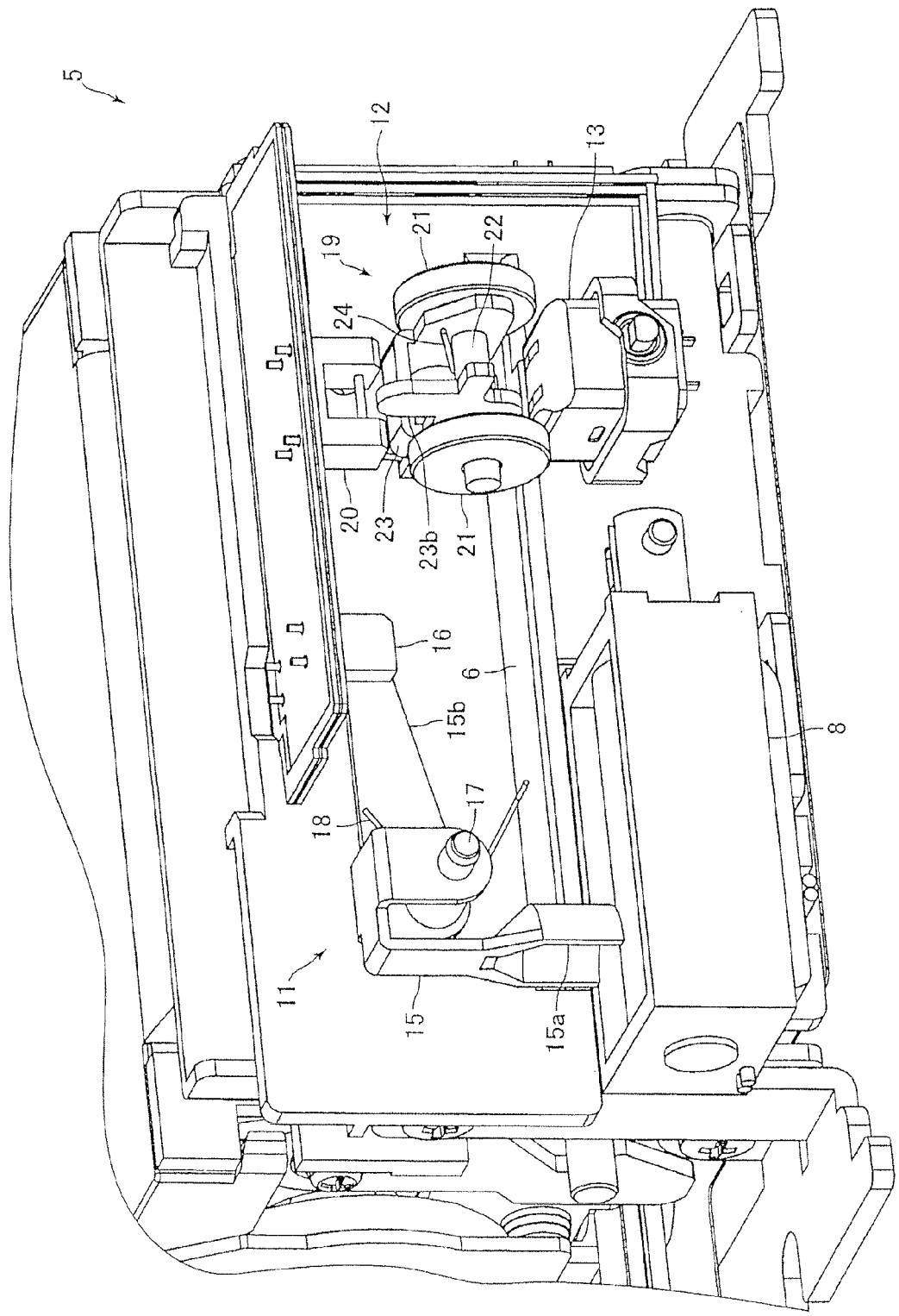
FIG. 3 shows a perspective view to explain a width-detecting mechanism and a thickness-detecting mechanism arranged at the card inserting section shown in FIG. 1.

Configuration of Card Processing Device:

FIG. 1 is a perspective view of the card processing device 1 of an embodiment of the present invention. FIG. 2 is a cross-sectional view of a card insertion section 5 and part of a main section 3 shown in FIG. 1. FIG. 3 is a perspective view to explain the configuration of a width-detecting mechanism 11 and a thickness-detecting mechanism 12 arranged at the card insertion section 5.

The card processing device 1 of this embodiment is a card reader equipped with a magnetic head (illustration omitted) that reads magnetic data recorded on a card 2 and/or records magnetic data on the card 2. Therefore, the card processing device 1 of this embodiment is denoted as "card reader 1". As shown in FIG. 1, the card reader 1 is configured by a main section 3 in which the above-mentioned magnetic head is arranged and a card inserting section 5 at which a card insertion slot 4 is formed for the card 2 to be inserted. Inside the card reader 1, as shown in FIG. 2, a card transport passage 6 on which the card 2 is transported is formed. Also, inside the main section 3, a card-transporting mechanism (illustration omitted) is arranged to transport the card 2 on the card transport passage 6.

The card 2 is a rectangular vinyl chloride card having a thickness of 0.7 to 0.8 mm, for example. On the card 2 (on the back face of the card 2 in FIG. 2, more specifically), a magnetic stripe (illustration omitted) is formed so that magnetic data can recorded. Note that an IC chip may be fixed in or a communication antenna may be built into the card 2. Also, the card 2 may be a PET (polyethylene terephthalate) card having a thickness of 0.18 to 0.36 mm or a paper card having a predetermined thickness.

As shown in FIG. 2, a shutter 7 is arranged in the card transport passage 6. The shutter 7 is positioned at the border between the main section 3 and the card inserting section 5. A solenoid 8 (see FIG. 3) is coupled with the shutter 7 so that the shutter 7 is movable between the closed position to close the card transport passage 6 (the position shown in FIG. 2) and the open position to open the card transport passage 6 with the power of the solenoid 8. In this embodiment, when the solenoid 8 is excited, the shutter 7 is moved to the open position; when the solenoid 8 is non-excited, the shutter 7 is moved to the closed position by the urging force of a spring which is not illustrated. Also, when it is in idle-status where the card 2 is not inserted in the card reader 1, the shutter 7 stays in the closed position to keep the card transport passage 6 closed.

At the card inserting section 5, as shown in FIG. 3, a width-detecting mechanism 11 for detecting the width of the card 2 which is inserted at the card insertion slot 4, a thickness-detecting mechanism 12 for detecting the thickness of the card which is inserted at the card insertion slot 4 and a pre-head (magnetic head) 13 for detecting the presence/absence of the magnetic stripe of the card 2 inserted at the card insertion slot 4. In other words, the width-detecting mechanism 11, the thickness-detecting mechanism 12 and the pre-head 13 are arranged between the card insertion slot 4 and the shutter 7.

The width-detecting mechanism 11 has a lever member 15 as a width-direction contact member which is displaced as it makes contact with an end face 2a of the card 2 in the width direction (see FIG. 1) and a width-detecting sensor 16 which detects the displacement of the lever member 15. The width-detecting sensor 16 is an optical sensor having a light-emitting device and a light-receiving device. More specifically, the width-detecting sensor 16 is a photo interrupter.

The lever member 15 is configured by a card contact portion 15a with which the end face 2a of the card 2 makes contact and a light-shielding portion 15b which stands between the light-emitting device and light-receiving device of the width-detecting sensor 16. As shown in FIG. 3, the card contact portion 15a and the light-shielding portion 15b are formed such that they are perpendicular to each other; the lever member 15 is formed to have an L-shape when viewed from the transporting direction of the card 2.

The lever member 15 is supported rotatably by a fixed shaft 17 which is secured to the frame of the card inserting section 5 having the transporting direction of the card 2 as the axial direction. More specifically described, the lever member 15 is supported rotatably by the fixed shaft 17 so that the card contact portion 15a can move with respect to the card transport passage 6 from one end of the card transport passage 6 in the width direction of the card 2. Also, the lever member 15 is urged by a torsion spring, through which the fixed shaft 17 is inserted, in the direction in which portion of the card contact portion 15a is positioned in the card transport passage 6.

In this embodiment, when the card 2 is not inserted at the card insertion slot 4, the card contact portion 15a is positioned in the card transport passage 6 and the light-shielding portion 15b stands between the light-emitting device and light-receiving device of the width-detecting sensor 16. When the card 2 having the width that satisfies a predetermined standard is inserted at the card insertion slot 4 under this condition, the end face 2a of the card 2 makes contact with the card contact portion 15a and the lever member 15 is moved around the fixed shaft 17 in the direction in which the card contact portion 15a withdraws from the card transport passage 6. When the lever member 15 is moved around the shaft, the light-shielding portion 15b is no longer standing between the light-emitting device and light-receiving device of the width-detecting sensor 16 and therefore, the card 2 is detected. On the other hand, when the card 2 having a narrower width which does not satisfy a predetermined standard is inserted at the card insertion slot 4, the end face 2a of the card 2 does not make contact with the card contact portion 15a at all or the moving amount of the lever member 15 would be small even if the end face 2a of the card 2 makes contact with the card contact portion 15a. For this reason, the light-shielding portion 15b remains standing between the light-emitting device and light-receiving device of the width-detecting sensor 16, and therefore, the card 2 will not be detected. In this way, the width-detecting mechanism 11 determines whether or not the width of the inserted card 2 is an appropriate width that satisfies a predetermined standard.

The thickness-detecting mechanism 12 and the pre-head 13 are arranged to be opposite to each other in the thickness direction of the card 2. The pre-head 13 is arranged such that the front end portion thereof at which a magnetic gap is formed is directed toward the thickness-detecting mechanism 12. Also, the pre-head 13 is arranged in a position at which it abuts on the magnetic stripe of the card 2.

The thickness-detecting mechanism 12 is configured by a thickness-direction contact member 19 that is displaced as it makes contact with the front face 2b of the card 2 (see FIG. 1) and a thickness-detecting sensor 20 that detects the displacement of the thickness-direction contact member 19. The thickness-direction contact member 19 has a pair of rollers 21 that make contact with the front face 2b of the card 2, a fixed shaft 22 that supports the rollers 21 rotatably, and a shaft-securing member 23 to which the fixed shaft 22 is secured. The thickness-detecting sensor 20 is an optical sensor having a light-emitting device and a light-receiving device. More specifically, the thickness-detecting sensor 20 is a photo interrupter.

A pair of the rollers 21 are supported rotatably at both ends of the fixed shaft 22 respectively. The fixed shaft 22 is fixed to the shaft-securing member 23 having the width direction of the card 2 as the axial direction. A light-shielding portion 23b is formed to the shaft-securing member 23 to stand between the light-emitting device and light-receiving device of the thickness-detecting sensor 20.

The shaft-securing member 23 is supported rotatably by a fixed shaft (illustration omitted) that is fixed to the frame of the card inserting section 5 having the width direction of the card 2 as the axial direction. More specifically described, the shaft-securing member 23 is supported rotatably by the fixed shaft such that the rollers 21 can move in and out with respect to the card transport passage 6 from one end of the card transport passage 6 in the thickness direction of the card 2. Also, the shaft-securing member 23 is urged by a torsion spring 24 through which the fixed shaft passes in the direction in which a portion of the rollers 21 is positioned in the card transport passage 6. Also, a pair of rollers 21 are arranged at both sides of the pre-head 13 in the width direction of the card 2, as shown in FIG. 3.

In this embodiment, when the card 2 is not inserted at the card insertion slot 4, a portion of the rollers 21 is positioned in the card transport passage 6, and the light-shielding portion 23b is not standing between the light-emitting device and light-receiving device of the thickness-detecting sensor 20. When the card 2 having the card thickness that satisfies a predetermined standard is inserted at the card insertion slot 4 under this condition, the front face 2b of the card 2 makes contact with the rollers 21 and the shaft-securing member 23 moves and rotates in the direction in which the rollers 21 withdraw from the card transport passage 6. As the shaft-securing member 23 moves and rotates, the light-shielding section 23b moves to stand between the light-emitting device and light-receiving device of the thickness-detecting sensor 20; therefore, the card 2 is detected. On the other hand, the card 2 having a lesser thickness which does not satisfy a predetermined standard is inserted at the card insertion slot 4, the front face 2b of the card 2 does not make contact with the rollers 21 at all or the moving amount of the shaft-securing member 23 is small even if the front face 2b of the card 2 makes contact with the rollers 21. For this reason, the light-shielding portion 23b does not stand between the light-emitting device and light-receiving device of the thickness-detecting sensor 16, and therefore, the card 2 will not be detected. In this way, the thickness-detecting mechanism 12 detects whether or not the thickness of the inserted card 2 is an appropriate thickness that satisfies a predetermined standard.

Figure 4:
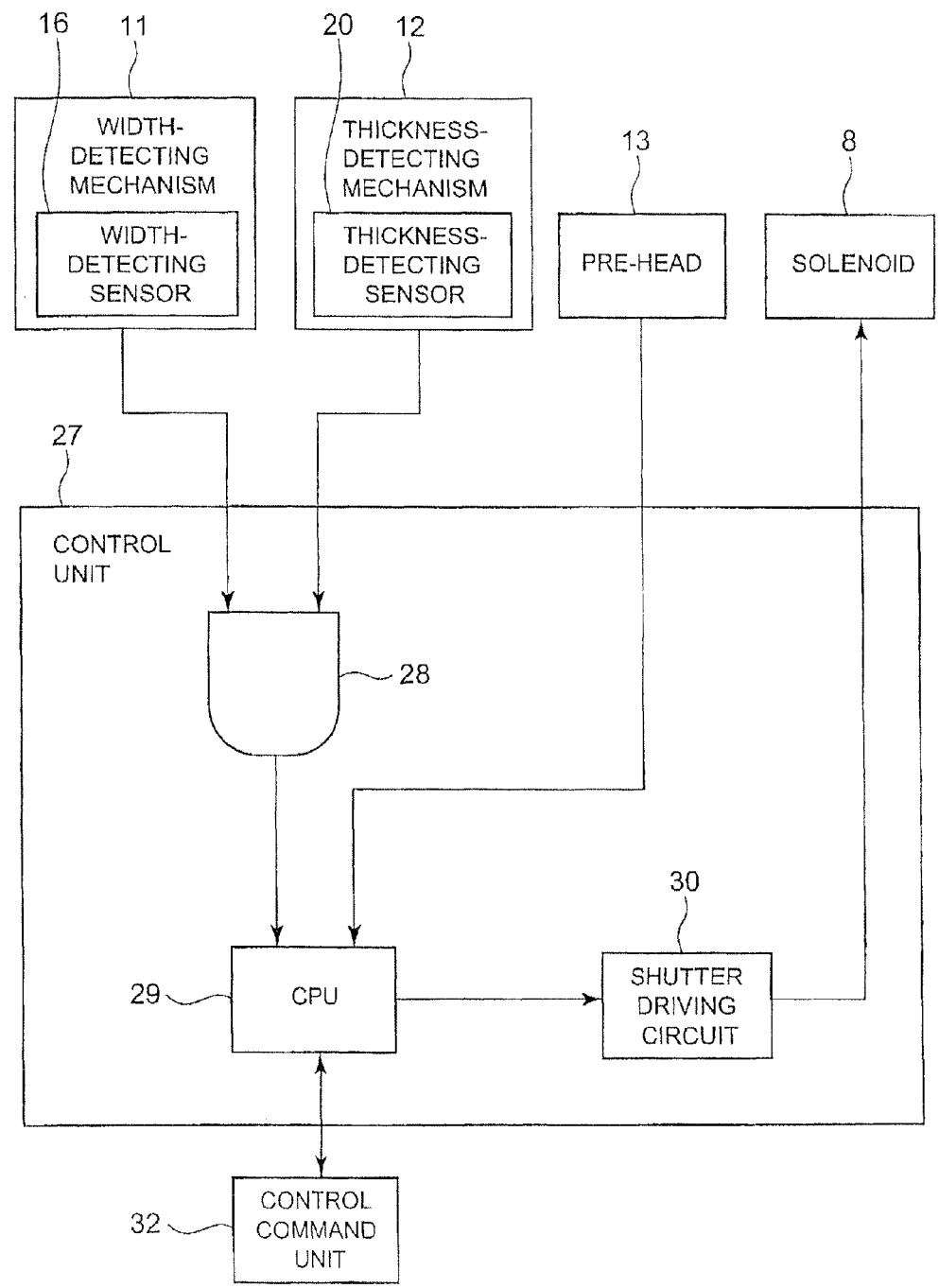
FIG. 4 shows a block diagram showing the configuration of a control unit and its associated sections of the card processing device shown in FIG. 1.

Configuration of Control Unit:

FIG. 4 is a block diagram showing the configuration of the control unit 27 and its related sections of the card processing device 1 shown in FIG. 1. Note that FIG. 4 illustrates the configuration related to the open-close control of the shutter 7.

The card reader 1 is equipped with a control unit 27 for implementing various controls. The control unit 27 is provided with an AND circuit (logical conjunction circuit) 28 to which the width-detecting sensor 16 and the thickness-detecting sensor 20 are connected, a CPU 29 as a computation circuit that outputs control signals to perform+which the shutter is coupled, all of which are the configuration related to the opening and closing control of the shutter 7.

The width-detecting sensor 16 and the thickness-detecting sensor 20 are connected to the input side of the AND circuit 28; the width detection signal, which is output from the width-detecting sensor 16 when the card 2 is detected by the width-detecting sensor 16, and the thickness detection signal, which is output from the thickness-detecting sensor 20 when the card 2 is detected by the thickness-detecting sensor 20, can be input to the AND circuit 28. Also, the output side of the AND circuit 28 is connected to the CPU 29. When both the width detection signal and the thickness detection signal are input, the AND circuit 28 outputs the card detection signal to the CPU 29. In other words, when neither of the two signals, the width detection signal and the thickness detection signal, is input or either one of them is not input, the AND circuit 28 does not output the card detection signal to the CPU 29. Note that an amplifier circuit and the like which is not illustrated is arranged between the width-detecting sensor 16 and the AND circuit 28 and between the thickness-detecting sensor 20 and the AND circuit 28.

In addition to the AND circuit 28, the pre-head 13 is connected to the CPU 29 so that the magnetic stripe detection signal, which is output from the pre-head 13 when the magnetic stripe formed on the card 2 is detected by the pre-head 13, can be input [to the CPU 29]. Also, the shutter driving circuit 30 is connected to the CPU 29; when the predetermined conditions are met, the CPU 29 outputs a shutter open signal to the shutter driving circuit 30 to excite the solenoid 8 to move the shutter 7 in the opening direction. Note that an amplifier circuit and the like which is not illustrated is arranged between the pre-head 13 and the CPU 29.

Connected also to the CPU 29 is a control command unit 32 which is a control unit of a card processing system (illustration omitted) to which the card reader 1 is installed. The card detection signal and the magnetic stripe detection signal can be input to the control command unit 32 via the CPU 29; when the card detection signal and the magnetic stripe detection signal are input, the control command unit 32 outputs a control command to the CPU 29 to output a shutter open signal. Also, the CPU 29 to which the control command has been input outputs a shutter open signal to the shutter driving circuit 30. In this way, in this embodiment, when the card 2 is detected by the width-detecting mechanism 11 and the thickness-detecting mechanism 12 and the magnetic stripe of the card 2 is detected by the pre-head 13, the shutter 7 is moved to the open position and accordingly the card transport passage 6 is opened.

Major Effects of the Embodiment

As described above, the card reader 1 of this embodiment is equipped with the width-detecting mechanism 11 and the thickness-detecting mechanism 12 which are positioned between the card insertion slot 4 and the shutter 7. Therefore, in this embodiment, the card reader can determine whether or not the card 2 inserted at the card insertion slot 4 is a normal card 2 by detecting the width and the thickness of the card 2. Also, since the pre-head 13 is arranged between the card insertion slot 4 and the shutter 7 in this embodiment, the card reader can determine whether or not the card inserted at the card insertion slot 4 is a normal card 2 by detecting whether or not the card 2 has a magnetic stripe formed thereon in addition to detecting the width and the thickness of the card 2.

Therefore, whether or not a normal card 2 is inserted at the card insertion slot 4 can be properly determined in this embodiment. Consequently, this enables the prevention of malicious mischief and crimes by properly controlling the opening and closing of the shutter 7, increasing the reliability of the card reader 1.

In this embodiment, the width-detecting mechanism 11 is equipped with the lever member 15 that is displaced as it makes contact with the end face 2a of the card 2, and the thickness-detecting mechanism 12 is equipped with the thickness-direction contact member 19 that is displaced as it makes contact with the front face 2b of the card 2. In other words, the lever member 15 that directly makes contact with the card 2 in the width direction of the card 2 and the thickness-direction contact member 19 that directly makes contact with the card 2 in the thickness direction of the card 2 are provided in this embodiment. Therefore, accuracy of detecting the card 2 in the width direction and thickness direction of the card 2 can be increased. Thus, in this embodiment, the card reader can more accurately determine whether or not a normal card 2 is inserted at the card insertion slot 4. As a result, this enables the prevention of malicious mischief and crimes by properly controlling the opening and closing of the shutter 7, thus increasing the reliability of the card reader 1.

In this embodiment, the control unit 27 is equipped with the AND circuit 28 to which the width-detecting sensor 16 and the thickness-detecting sensor 20 are connected; therefore, the two kinds of signals, the width detection signal output from the width-detecting sensor 16 and the thickness detection signal output from the thickness-detecting sensor 20, will not be input to the CPU 29. Also, unless the width detection signal and the thickness detection signal are both input to the AND circuit 28, the card detection signal will not be input to the CPU 29. Therefore, in this embodiment, even when the card reader 1 is equipped with both the width-detecting mechanism 11 and the thickness-detecting mechanism 12, the processing load in the CPU 29 can be reduced. Further, in this embodiment, the number of the connection ports of the CPU 29 can be reduced compared to the configuration in which the two separate signals, the width detection signal and the thickness detection signal, are input to the CPU 29.

Other Embodiment

The above-described embodiment is an example of the preferred embodiment of the present invention; however, the present invention is not limited to this, but can be variously modified within the scope of the present invention.

Since a magnetic stripe is formed on the card 2 inserted into the card reader in the above-described embodiment, the control command unit 32 outputs a control command to the CPU 29 to output a shutter open signal when both the card detection signal and the magnetic stripe detection signal are input. Alternatively, when the card 2 inserted into the card reader 1 is an IC card with no magnetic stripe, the control command unit 32 may output a control command to the CPU 29 to output a shutter open signal in response to the card detection signal even if the magnetic stripe detection signal is not input. The card processing system to which the card reader 1 is installed can choose, according to the card 2 which is processed, whether or not to use the magnetic stripe detection signal for the opening and closing control of the shutter 7.

In the above-described embodiment, the CPU 29 is connected to the control command unit 32; however, the CPU 29 may not be connected to the control command unit 32. In this case, when both the card detection signal and the magnetic stripe detection signal are input, the CPU 29 outputs a shutter open signal to the shutter driving circuit 30.

In the above-described embodiment, the card reader 1 is equipped with the pre-head 13, but the card reader 1 may not be equipped with the pre-head 13. Also, the card reader 1 may have a metal-detecting mechanism, in place of the pre-head 13, that detects an IC chip fixed on the card 2. In this case, the control command unit 32 outputs a control command to the CPU 29 to output a shutter open signal when a metal detection signal output from the metal-detecting mechanism which has detected the IC chip and the card detection signal are input via the CPU 29. Alternatively, the control command unit 32 outputs a control command to the CPU 29 to output a control signal to implement a predetermined control on the IC contact block which makes contact with the IC chip on the card 2 to read data when the metal detection signal and the card detection signal are input via the CPU 29.

The card reader 1 is equipped with the shutter 7 in the above-described embodiment, but the card reader 1 may not be equipped with the shutter 7. Even in this case, the control command unit 32 outputs a control command to the CPU 29 to output a control signal to implement a predetermined control when both the card detection signal and the magnetic stripe detection signal are input. For example, the control command unit 32 outputs a control command to the CPU 29 to output a control signal to start the card transport mechanism to take the card 2 inside the card reader 1 when both the card detection signal and the magnetic stripe detection signal are input.

In the above-described embodiment, the width-detecting sensor 16 is an optical sensor. Alternatively, the width-detecting sensor 16 may be a mechanical sensor such as a contact switch having a lever member and a contact-type switch that turns on and off according to the movement of the lever member. In the same manner, the thickness-detecting sensor 20 may be a mechanical sensor.

In the above-described embodiment, the lever member 15 is positioned such that the card contact portion 15a can move in and out with respect to the card transport passage 6 from one end of the card transport passage 6 in the width direction of the card 2; however, as disclosed in the above-described JP 2003-323588, two lever members 15 may be positioned so that the card contact portion 15a can move in and out with respect to the card transport passage 6 from both ends of the transport passage 6 in the width direction of the card 2. Also, in the above-described embodiment, the thickness-detecting mechanism 12 is equipped with a pair of rollers 21; however, the thickness-detecting mechanism 12 may be equipped with a single roller 21 that is arranged opposite to the pre-head 13, as disclosed in the above-mentioned JP 2007-11458.

In the above-described embodiment, the width-detecting mechanism 11 is configured by the lever member 15 and the width-detecting sensor 16; however, the width-detecting mechanism may be configured by the light-emitting device and the light-receiving device which are positioned to face the card transport passage 6. Also, the width-detecting mechanism or the thickness-detecting mechanism may be configured by a contact switch.

In the above-embodiment, the card reader 1 is a card transport-type card reader equipped with the card transport mechanism; however, a card reader to which the configuration of the present invention is applied may be a manual card reader that is not equipped with the card transport mechanism. Also, in the above-described embodiment, the card processing device of the embodiment of the present invention has been described using the card reader 1 having the magnetic head for reading and recording magnetic data as an example; however, the card processing device to which the present invention is applied may be a printer equipped with a printing mechanism or a image reading device equipped with a scanner.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

DESCRIPTION OF CODES

1 Card reader (Card processing device)
2 Card
2a End face of a card in the width direction
2b Front face of a card
4 Card insertion slot
6 Card transport passage
7 Shutter
11 Width-detecting mechanism
12 Thickness-detecting mechanism
13 Pre-head (Magnetic head)
15 Lever member (Width-direction contact member)
16 Width-detecting sensor
19 Thickness-direction contact member
20 Thickness-detecting sensor
28 AND circuit
29 CPU (Computation circuit)
30 Shutter driving circuit
32 Control command unit

What is claimed is:

1. A card processing device comprising:
    a width-detecting mechanism configured to detect the width of a card inserted at a card insertion slot and outputs a width detection signal;
    a thickness-detecting mechanism configured to detect the thickness of said card inserted at said card insertion slot and outputs a thickness detection signal;
    an AND circuit to which said width-detecting mechanism and said thickness-detecting mechanism are connected, the AND circuit being configured to output a card detection signal when said width detection signal and said thickness detection signal are input thereto; and
    a computation circuit configured to output control signals to implement predetermined controls based on said card detection signal input from said AND circuit.

2. The card processing device as set forth in claim 1 further comprising:
    a shutter movable between a closed position where a card transport passage in which said card is transported is closed, and an open position where said card transport passage is opened; and
    a shutter driving circuit that drives said shutter;
    wherein said width-detecting mechanism and said thickness-detecting mechanism are positioned between said card insertion slot and said shutter; and
    wherein said computation circuit is configured to output a shutter open signal to said shutter driving circuit to move said shutter to said open position based on said card detection signal.

3. The card processing device as set forth in claim 2 further comprising:
    a magnetic head positioned between said card insertion slot and said shutter, the magnetic head configured to detect a magnetic stripe formed on said card, and output a magnetic stripe detection signal to said computation circuit.

4. The card processing device as set forth in claim 1;
wherein said width-detecting mechanism includes:
- a width-direction contact member configure to be displaced as it makes contact with the end face of said card in the width direction; and
- a width-detecting sensor configured to detect the displacement of said width-direction contact member; and wherein said thickness-detecting mechanism includes:
- a thickness-direction contact member configure to be displaced as it makes contact with the front face of said card; and
- a thickness-detecting sensor configured to detect the displacement of said thickness-direction contact member.

5. A card processing system comprising:
the card processing device of claim 3; and
a control command unit that is connected to said computation circuit;
wherein said control command unit is configured to output a control command to said computation circuit to output said shutter open signal when said card detection signal and said magnetic stripe detection signal are input via said computation circuit, and to output a control command to said computation circuit to output said shutter open signal when said card detection signal is input via said computation circuit and the magnetic head does not detect a magnetic stripe on said card.

* * * * *